United States Patent [19]

Dubin

[11] Patent Number: 4,532,047

[45] Date of Patent: Jul. 30, 1985

[54] SILICA INHIBITION: PREVENTION OF SILICA DEPOSITION BY ADDITION OF LOW MOLECULAR WEIGHT ORGANIC COMPOUNDS

[75] Inventor: Leonard Dubin, Skokie, Ill.

[73] Assignee: Nalco Chemical Company, Oak Brook, Ill.

[21] Appl. No.: 626,173

[22] Filed: Jun. 29, 1984

[51] Int. Cl.³ .............................. C02F 5/10; C02F 5/12
[52] U.S. Cl. .................................... 210/698; 210/696; 252/180; 252/181
[58] Field of Search ........................ 210/696, 698–701; 252/180, 181, 389.4, 389.41; 422/13, 15, 18, 19

[56] References Cited

U.S. PATENT DOCUMENTS

| | | | |
|---|---|---|---|
| 2,805,915 | 9/1957 | Rohrback | 210/696 |
| 3,284,319 | 11/1966 | Hill | 252/389.4 |
| 3,436,350 | 10/1964 | Schwedler | |
| 3,639,279 | 2/1972 | Gardner et al. | 252/180 |
| 3,671,447 | 6/1972 | Kowalski | 210/698 |
| 3,671,448 | 6/1972 | Kowalski | 210/700 |
| 3,770,413 | 11/1973 | Tabor et al. | 252/389.4 |
| 3,852,213 | 12/1974 | Cooney | 210/698 |
| 3,948,792 | 4/1976 | Walsen et al. | 210/700 |
| 4,000,083 | 12/1976 | Heesen | 252/181 |
| 4,328,106 | 5/1982 | Harrar et al. | 210/700 |
| 4,344,862 | 8/1982 | Widder et al. | 252/389.41 |
| 4,405,461 | 9/1983 | Rogers | 210/698 |

OTHER PUBLICATIONS

Weres, O., Yee, A., Tsao, L., Kinetics of Silica Polymerization, May 1980, University of California, Lawrence Berkely Laboratory Earth Science Division, U.S. Dept. of Energy Contract W-7405-Eng-48.
Iler, Ralph K., The Chemistry of Silica, New York, John Wiley and Sons, 1979.
On-Line Tests of Organic Additives for the Inhibition of the Precipitation of Silica from Hypersaline Geothermal Brine by Jackson, E. Harrar and Others, Apr. 3, 1979, U.S. Government Contract Report *UCI-D-18091.
Field Tests of Organic Additives for Scale Control at the Salton Sea Geothermal Field by Harrar, J. E., and Others, Society of Petroleum Engineers Journal, Feb. 1982, pp. 17–27.
On-Line Tests of Organic Additives for the Inhibition of the Precipitation of Silica from Hypersaline Geothermal Brine IV, Final Tests of Candidate Additives, by Jackson E. Harrar and Others, Feb. 1980, University of California, Lawrence Livermore, Report UCID–18536.
Final Report on Tests of Proprietary Chemical Additives as Antiscalants for Hypersaline Geothermal Brine, by J. E. Harrar and Others, Lawrence Livermore Laboratory, Jan. 1980, Report #UCID–18521.
On-Line Tests of Organic Additives for the Inhibition of the Precipitation of Silica form Hypersaline Geothermal Brine III, Scaling Measurements and Tests of Other Methods of Brine Modification, by J. E. Harrar and Others, Report #UCID–18238.
Meutterties, The Chemistry of Boron and its Compounds, New York, John Wiley and Sons, 1980.
Cotton, F., Albert and Wilkinson, Geoffrey, Advanced Inorganic Chemistry, New York, John Wiley and Sons, 1980.

*Primary Examiner*—Peter Hruskoci
*Attorney, Agent, or Firm*—John G. Premo; Donald G. Epple

[57] ABSTRACT

A method of inhibiting amorphous silica scale formation on surfaces in contact with industrial waters which comprises treating said waters with an effective amount for the purpose of inhibiting amorphous silica scale formation of a water-soluble, low molecular weight polypolar organic compound containing hydroxyl, primary amino and/or secondary amino functional groups, and mixtures thereof, or with a combination of this polypolar organic compound with a boron compound which forms or is hydrolyzed to form orthoborate ions when dissolved in the industrial waters.

10 Claims, No Drawings

SILICA INHIBITION: PREVENTION OF SILICA DEPOSITION BY ADDITION OF LOW MOLECULAR WEIGHT ORGANIC COMPOUNDS

INTRODUCTION

Amorphous silica scales cause significant fouling problems when industrial waters contain high quantities of silica. For the most part, high quantities of silica means that the industrial waters contain at least 5.0 ppm and up to about 500 ppm dissolved silica and may contain higher quantities of silica either in dissolved or dispersed or even, perhaps, colloidal forms.

At the present time, there does not appear to be any commercially available treatment for controlling this amorphous silica fouling in industrial waters which are used for heat exchange purposes, for downhole drilling waters in the recovery of petroleum crudes, in industrial waters used to prepare boiler waters, or in seawater evaporators and other distillation-type techniques. We have developed a test which allows us to screen and identify useful chemical treatments for inhibiting amorphous silica deposition, scale formation, precipitation, and the like. Various chemical treatments have been found which are useful inhibitors for the formation of amorphous silica scale, and these will be described later.

It is an object of this invention to describe and disclose the chemical treatments which inhibit amorphous silica deposition, amorphous silica scale formation, and silica precipitation from industrial waters containing high quantities of silica.

Another object of this invention is to present a method of inhibiting amorphous silica scale formation on surfaces in contact with industrial waters which comprises treating these waters with effective amounts, for the purpose of inhibiting amorphous silica scale formation, of various chemical treating agents.

It is also an object of this invention to present a method of inhibiting amorphous silica scale formation on heat exchange surfaces in contact with alkaline industrial waters containing high concentrations of silica which comprises treating these industrial waters with effective amounts, for the purpose of inhibiting amorphous silica scale formation on these heat exchange surfaces, of various treating agents to accomplish this inhibition.

PRIOR ART

Schwedler, in U.S. Pat. No. 3,436,350, teaches a method of preventing silica bake-on deposits when using highly concentrated silica detergent compositions on glassware and the like. He claims a method of preventing bake-on deposits from mechanical dishwashing machine detergents which contain alkali metal silicates wherein the silicates are selected from the group consisting of orthosilicate, metasilicate, and the like, which consists of adding to these detergents a boron-containing compound selected from the group consisting of boric acid acid and all metal borates wherein the boric acid or metal borate is present at least at stoicimetric amounts sufficient to convert crystalline silicates to the distillates when the mixture is dissolved in water. This would normally require at least a 2:1 mole ratio of metasilicate to borate-containing compound. These detergents may also be used as steam cleaning compounds for the industrial cleansing of glass surfaces. U.S. Pat. No. 3,436,350 is incorporated herein by reference.

In addition, applicant is aware of the following references which discuss generally the kinetics of silica for polymerization, the chemistry of silica in general, and some online tests of various organic additives for inhibition of precipitation of silica from hypersaline geothermal brines. These references are listed in the following bibliography:

1. Weres, O., Yee, A., Tsao, L., *Kinetics of Silica Polymerization*, May 1980, University of California, Earth Science Division, U.S. Dept. of Energy Contract W-7405-Eng-48.
2. Iler, Ralph K., *The Chemistry of Silica*, New York, John Wiley and Sons, 1979.
3. On-Line Tests of Organic Additives for the Inhibition of the Precipitation of Silica from Hypersaline Geothermal Brine by Jackson, E. Harrar and others, Apr. 3, 1979, U.S. government contract Report #UCID-18091.
4. Field Tests of Organic Additives for Scale Control at the salton Sea Geothermal Field by Harrar, J. E., and others, *Society of Petroleum Engineers Journal*, February, 1982, pp. 17-27.
5. On-line Tests of Organic Additives for the Inhibition of the Precipitation of Silica from Hypersaline Geothermal Brine IV. Final Tests of Candidate Additives, by Jackson E. Harrar and others, February 1980, University of California, Lawrence Livermore, Report UCID-18536.
6. Final Report on Tests of Proprietary Chemical additives as Antiscalants for Hypersaline Geothermal Brine, by J. E. Harrar and others, Lawrence Livermore Laboratory, January 1980, Report #UCID-18521.
7. On-Line Tests of Organic Additives for the Inhibition of the Precipitation of Silica from Hypersaline Geothermal Brine III. Scaling Measurements and Tests of Other Methods of Brine Modification, by J. E. Harrar and others, Report #UCID-18238.
8. Meutterties, *The Chemistry of Boron and its Compounds*, New York, John Wiley and Sons, 1967.
9. Cotton, F., Albert and Wilkinson, Geoggrey, *Advanced Inorganic Chemistry*, New York, John Wiley and Sons, 1980.

Each of these previous nine (9) references are incorporated herein by reference.

THE INVENTION

I have discovered a method of inhibiting amorphous silica scale formation from industrial waters which comprises treating said waters with an effective amount for the purpose of inhibiting amorphous silica scale formation of a water-soluble low molecular weight polypolar organic compound containing hydroxyl, primary amino, and/or secondary amino functional groups, and mixtures thereof. The molecular weight of the polypolar organic compounds do not exceed about 500, and preferably the molecular weight of these polypolar organic compounds do not exceed about 200.

POLYPOLAR ORGANIC COMPOUND

By the term, "polypolar organic compound", we mean organic compounds which contain hydroxyl groups, primary amino groups, secondary amino groups, combinations of each of these hydroxyl, primary amino, or secondary amino functional groups, and mixtures of these types of polypolar organic compounds. For example, a polypolar organic compound may be exclusively a polyhydroxy compound, again with a molecular weight not exceeding about 500 and preferably having a molecular weight not exceeding about 200 which may be chosen from the group consisting of ethylene glycol, glycerine, manitol, sorbitol, tris(hydroxy methyl)methane, tris(hydroxy methyl)methanol, and the like.

Similarly, the polypolar organic compounds may be polyamino compounds, again preferably having a molecular weight not exceeding about 500 and most preferably having a molecular weight not exceeding about 200 which may be chosen from the group consisting of ethylene diamine, triethylene tetramine, 1,6-hexamethylene diamine, bis-hexamethylene triamine, tetraethylene pentamine, and the like.

In a similar fashion, the polypolar organic compound may be an alkanol amine having both hydroxyl and amino functionality and having a molecular weight not exceeding about 500, and preferably having a molecular weight not exceeding about 200. These alkanol amines may be represented by the group consisting of monoethanol amine, diethanol amine, N-ethylamino monoethanol amine, N, N, diethanol amine, triethanol-amine, N, N, N, N-tetrakis(hydroxy ethyl)ethylene diamine, and the like.

Finally, by the term, "polypolar organic compound," we also mean mixtures of any and all of the above mentioned materials.

The effective amounts of these organic water-soluble, low molecular weight polypolar organic compounds are normally at least 10 ppm based on the total amount of industrial waters being treated. Preferably the concentration of these polypolar organic compounds are at least 50 ppm and may require effective treatment at concentrations of at least 100 ppm to completely inhibit the formation of amorphous silica scales on surfaces on contact with the industrial waters being so treated.

THE INDUSTRIAL WATER

The industrial waters which require treatment with these polypolar organic compounds are generally industrial waters which contain silica in a dissolved, suspended or colloidal form. Such industrial waters are typified by those waters found in the Gulf of Mexico states, such as on the industrial Gulf Coast of Louisiana and Texas. The silica present is present as dissolved silicates or their complex ions and may also be present as colloidal silica or suspended silica. The total silica concentration in these industrial waters is normally low but when it exceeds about 5 ppm in total concentration, amorphous silica scale formation becomes a problem. Obviously, the higher the concentration of total silica from all sources in these industrial waters, the more difficult is the problem created by amorphous silica scale formation.

The industrial waters may be cooling waters, geothermal waters, salt waters for desalinization purposes, industrial waters being prepared for boiler treatment and steam generation, downhole waters for petroleum crude recovery, and the like. The problem of amorphous silica scale formation on the surfaces in contact with these industrial waters is particularly noted when the industrial waters are alkaline, having a pH of at least 5.0 or above, and contain at least 5 ppm total silica as $SiO_2$. The effective use of the polypolar compounds of this invention are at pH's of at least 5.0 and above and may be at temperatures ranging between ambient temperatures to temperatures in excess of 300° F. Of particular importance is the treatment of alkaline industrial waters being used as cooling waters, either on a once-through basis or particularly in a recirculating cooling water system wherein the make-up waters concentrate by up to a factor of 10 or so. When these alkaline cooling waters contain sufficient total silica, the problem of amorphous silica scale formation on surfaces in contact with these cooling waters is exaggerated. As the alkalinity increases, the problem of amorphous silica scale formation also increases. Therefore, the effectiveness of the polypolar compounds used in this invention must also be demonstrated at pH's in excess of about 8.0.

Finally, the polypolar compounds of this invention may be combined with other standard cooling water treatments such as those used to inhibit corrosion and those treatments used to disperse or prohibit scale formation of other types. These type treatments may contain standard ingredients such as chromium, zinc, phosphate, orthophosphate, polyphosphate, low molecular weight polymeric dispersants such as the homo or copolymers of acrylic acid, acrylamide, and various acrylates which are primarily used as threshold agents in this cooling water application. These threshold agents combine with hardness precipitating species to inhibit crystal growth and better disperse these kinds of materials, thereby inhibiting scale formation of these hardness materials. However, these threshold polymeric agents do not have an effective use for silica control and are ineffective when used for amorphous silica scale control. Therefore, the polypolar compounds of this invention may be combined with these polymeric dispersants to effectively control scale formation of all kinds, including amorphous silica scale formation.

In addition, I have discovered a method of inhibiting amorphous silica scale formation on surfaces in contact with industrial waters which comprises treating said industrial waters with an effective amount for the purpose of inhibiting amorphous silica scale formation of an admixture of a water-soluble polypolar organic compound containing hydroxyl, primary amino, and/or secondary amino functional groups, and mixtures thereof, with a boron compound which forms orthoborate ions when dissolved in or hydrolyzed by said industrial waters.

The combination of polypolar organic compounds with orthoborate ions are preferably in a weight ratio of about 10:1 to about 1:10.

As before, the polypolar organic compound is chosen from the group consisting of ethylene glycol, glycerine, mannitol, sorbitol, tris(hydroxymethyl)methane, tris(hydroxymethyl)methanol, monoethanol amine, diethanolamine, N-ethylaminomonoethanolamine, N,N, diethanolamine, triethanolamine, N,N,N,N-tetrakis(hydroxyethyl)ethylenediamine, ethylene diamine, triethylenetetramine, 1,6 hexamethylenediamine, Bis-hexamethylenetriamine, tetraethylenepentamine, and the like, and mixtures thereof. The boron compound which forms orthoborate ion when dissolved in or hydrolyzed by these industrial waters is normally chosen from the group consisting of boric acid and its water-soluble salts, the boron trihalides which easily hydrolyze when added to aqueous systems, fluor-boric acid and its water-soluble salts, boron trifluoride ethylamino complex and boron trichloride-organic amine complexes, and mixtures thereof. It has been determined that to be effective in this combination, the boron compound must dissolve to form or be hydrolyzed to form the orthoborate ion. It has also been discovered that to be effective in this combination, the weight ratio of polypolar organic compounds to orthoborate ions must be about 10:1 to about 1:10. Finally, it is preferred that the industrial waters which are being treated by said combination of ingredients be alkaline cooling waters having a pH of at least 7.0 and preferably having a pH of about 8.0 or above. Again, these industrial waters may contain other treatment chemicals such as those mentioned earlier.

In addition to each of the above mentioned phenomenon, the industrial water system being treated to inhibit amorphous silica scale formation may contain calcium hardness, magnesium hardness, and various other hardness creating species. The chemicals required to inhibit amorphous silica scale formation, therefore, must be immune to the presence of these calcium and magnesium salts, since the presence of these hardness-containing cations often exaggerates the silica formation or forms a different type of scale from precipitates of either calcium or magnesium with soluble silicate. When the calcium or magnesium silicate scale is formed simultaneously with the amorphous silica scale, the problems can be further exaggerated in the industrial system. It is, therefore, important that the treatment system used to control and inhibit amorphous silica scale formation be effective in the presence of these hardness-containing waters.

To further demonstrate my invention, the following examples are presented:

EXAMPLES

A series of tests were made to quantify the degree of activity available from the polypolar organic compounds of this invention and the boron compounds which form orthoborate ion when dissolved in or hydrolyzed by the industrial waters. These tests were conducted in the presence and/or absence of other treating agents such as those mentioned above. The test procedures used to screen candidate treatment programs is as follows:

Fifty ml. of a 1% sodium metasilicate solution as ($SiO_2$) is passed through a strong cation exchange column into a 3 necked round bottom flask containing 300 ml. of water under reflux. The flask will also contain calcium hardness and any desired chemical treatment such as the polypolar organic compounds, boron compounds, or mixtures thereof. The column is eluted with 100 ml. distilled water; the pH is adjusted from 4-5 to 8.2-8.3 with 1% NaOH and a final 50 ml. of distilled water eluted through the column. The result is a reactor containing 500 ml. of solution with 500 ppm silicic acid as $SiO_2$, 300 ppm $Ca^{2+}$ as $CaCO_3$ and a test treatment at typically 100 ppm actives.

After heating for one hour under reflux, the solution is cooled overnight. The next day, after physical observations are made, part of the solution is filtered and both filtered and unfiltered samples are analyzed for total $SiO_2$ by AA and reactive (soluble) silica.

A blank, depending on the final pH, will give up to 150 ppm reactive silica and a total silica of about 200 ppm. Moderate activity is associated with a total filtered silica value of approximately 250 ppm $SiO_2$. High activity is associated with silica values of at least 300 ppm $SiO_2$. Treatments which allow obviously visible film scale on the reactor walls are severely downgraded. This is most likely to occur with treatments of modest activity.

In developing this test protocol, a number of variables were carefully considered to make sure that the procedure would conform and predict known chemistry, especially in regard to the blank. Table I shows the expected/theoretical solubility values for silica for a variety of pH conditions. Table II gives the results with the test apparatus. The data in Table II compares favorably with the expected values. Further analysis of the precipitate by X-ray confirm the presence of amorphous silica.

The effects of calcium hardness and pH were evaluated and the pertinent data are given in Table III. As predicted theoretically, condensation of the silicic acid to amorphous silica does not occur under acidic (pH-4) conditions. The reaction is driven by alkalinity, and for a number of mechanical reasons, a pH of 8.2-8.3 was chosen for the screening test. However, the results would be expected to apply to any alkaline water.

At a pH of 8.3, condensation goes rapidly and a readily filterable silica is obtained. As expected, the calcium at the level chosen had no effect on the condensation of the silica. The effect of the $Ca^{2+}$ is one of interference on the activity of the chemical treatment. A level of 300 ppm $Ca^{2+}$ as $CaCO_3$ is not unusual in cooling water applications and, in fact, is considered moderate.

Tables IV and V illustrate the effect of alkalinity on precipitated amorphous silica particle size. At a starting pH of 7.6, condensation is complete but the particles are generally too small for effective filtration by a 0.45 milipore filter. This was the basis for using a starting pH of 8.3.

The data in Tables IV and V also highlight an interesting analytical fact. By successively filtering through smaller millipore filters, it was noted that a reasonable estimation of the amount of reactive silica in solution can be obtained using AA. This is done by measuring the solution with AA after filtering through a 0.1 micron milipore and subtracting 10%.

Since boric acid was found to be effective for inhibiting silica and as boron is immediately diagonal to silicon in the periodic table, the question was raised about false analytical results involving boron and silicon. Table VI shows that there is no analytical interference involving either boron or silicon by both AA and the reactive molybdate test method.

The polypolar organic compounds would not be expected to cause analytical interference, so a similar comparison was not run.

The results of these test protocol using the polypolar organic compounds and the boron compounds of this invention are presented in Table VII.

TABLE I

| Theoretical Silica Solubility Limits | |
|---|---|
| pH | Solubility of Amorphous Silica* at 25° C. (ppm) |
| 6-8 | 120* |
| 9 | 138 |
| 9.5 | 180 |
| 10 | 310 |
| 10.6 | 876 |

*Source - The Chemistry of Silica by Ralph K. Iler.
**At 100° C., the solubility of silica is about 500 ppm $SiO_2$, and this is the basis for starting the reactions under boiling conditions.

TABLE II

EFFECT OF pH ON SILICA BLANK SCREENING RESULTS
(Standard Conditions with 300 ppm CaCO3)

| ml 1% NaOH | pH initial | pH final | Total $SiO_2$ - ppm (after filtering through 0.45 milipore) |
|---|---|---|---|
| 1.6 | 8.3 | 9.1 | 170 |
| 1.6 | 8.29 | 9.05 | 170 |
| 2.0 | 8.36 | 9.18 | 200 |
| 2.0 | 8.38 | 9.22 | 210 |
| 2.1 | 8.41 | 9.21 | 230 |
| 3.0 | 8.64 | 9.40 | 270 |
| 2.5+ | 8.6 | 9.4 | 260 |

TABLE III

EFFECT OF $Ca^{2+}$ AND pH ON CONDENSATION OF SILICA

| $Ca^{2+}$ ppm CaCO3 | Temperature C.° | pH Initial | pH Final | ppm $SiO_2$ Soluble (Reactive) | ppm $SiO_2$ Total (AA) |
|---|---|---|---|---|---|
| None | 100 | 7.8 | 8.6 | 150 | 470 |
| 300 | 100 | 4.4 | 4.3 | 460 | 470 |

TABLE IV

WATER ANALYSIS

| Number | Sample Marked | Soluble $SiO_2$ | Total $SiO_2$ |
|---|---|---|---|
| 1. | No filtering | 150. | 410. |
| 2. | 0.45 Millipore | 170. | 300. |
| 3. | 0.1 Millipore | 170. | 200. |
| 4. | 0.1 Sintered Glass | 170. | 180. |

TABLE V

EFFECT OF AMORPHOUS SILICA PARTICLE SIZE ON SILICA ANALYLSIS

| Filtering Condition | ppm $SiO_2$ Soluble Silica (Reactive) | ppm $SiO_2$ Total Silica (AA) |
|---|---|---|
| through 0.45 milipore | 120 | 400 |
| through 0.10 milipore | 120 | 160 |
| through both | 120 | 200 |
| Initial Hot no filtering | 410 (some time delay ~½ hour) | 515 |
| no filtering | 150 | 410 |
| through 0.45 milipore | 170 | 300 |
| through 0.10 milipore | 170 | 190 |

TABLE VI

EFFECT OF BORIC ACID ON SILICA ANALYSIS - STANDARD CONDITIONS

| $Ca^{2+}$ pm CaCO3 | Temperature C.° | pH Initial | pH Final | ppm $SiO_2$ Soluble (Reactive) | ppm $SiO_2$ Total (AA) | ppm $H_3BO_3$ |
|---|---|---|---|---|---|---|
| 300 | 100 | 4.4 | 4.3 | 460 | 470 | None |
| 300 | 100 | 4.4 | 4.3 | 460 | 480 | 100 |

TABLE VII

Silica Inhibition Screening Data

| Chemical Treatment (100 ppm Actives) | Total Silica Filtered (ppm $SIO_2$) |
|---|---|
| 1. 100 ppm $H_3BO_3$ + 150 ppm Glycerine | 410 |
| 2. $H_3BO_3$ | 390 |
| 3. H $BF_4$ | 380 |
| 4. $BF_3$ · Ethylamine complex | 360 |
| 5. 100 ppm $H_3BO_3$ + 293 ppm Mannitol | 350 |
| 6. Boric Acid | 330 |
| 7. N—Ethylamine monoethanolamine | 290 |
| 8. Monoethanolamine | 290 |
| 9. Diethanolamine | 290 |
| 10. Ethylene diamine | 290 |
| 11. 125 ppm $H_3BO_3$ | 290 |
| 12. Triethylenetetramine | 280 |
| 13. Ethylene glycol | 280 |
| 14. ARQUAD 16/50 (Trimethylhexadecyl-ammonium chloride) | 270 |
| 15. Bis-hexamethylene triamine | 270 |
| 16. 1,5-hexamethylenediamine | 270 |
| 17. Glycerine | 260 |
| 18. A polyimine of approx. 2000 MW | 260 |
| 19. Tetramethylammonium chloride | 255 |
| 20. Bis(2-Hydroxyethyl)Cocoamine oxide | 250 |
| 21. TETRONIC 1501 (EO/PO Block polymer from ethylene diamine, MW-7,900) | 250 |
| 22. Tris (hydroxymethyl) aminomethane | 250 |
| 23. AROMOX DMC 39% (Dimethylcocoamine oxide) | 250 |
| 24. LONZA POLYOL 7000 (Hydrogenated polymaltitol, 75% tetramer or higher) | 250 |
| 25. N—(2 Hydroxy-1,1-Bis hydroxyethyl) ethyl taurine | 240 |
| 26. N—(Tris hydroxymethyl) Methylglycine | 240 |
| 27. PLURONIC L-121 (EO/PO Block polymer, MW-4400) | 240 |
| 28. GOODRITE K-752 (2,000 MW poly acrylic acid) | 240 |
| 29. ETHOQUAD C/25 (Methylpolyoxyethylene (15) cocoammonium chloride | 240 |
| 30. A polyimine of approx. 75,000 MW | 240 |
| 31. PLURONIC 17R1 (PO/EO Block polymer, MW-1700) | 240 |
| 32. PLURONIC 21R1 (PO/EO Block polymer, MW-3250) | 240 |
| 33. Tetraethylenepentamine | 240 |
| 34. LONZA POLYOL 3070 Hydrogenated polymaltitul, 50-75% tetramer or higher) | 240 |
| 35. PLURONIC F-38 (EO/PO Block polymer, MW-4700) | 230 |
| 36. PLURONIC L-61 (EO/PO Block polymer, MW-2000) | 230 |
| 37. Tris (hydroxymethyl) aminomethane | 230 |
| 38. Mannitol | 230 |
| 39. Sorbitol | 230 |
| 40. Tetronic 50RI | 220 |
| 41. Pluronic L-31 (EO/PO Block polymer, MW-1100) | 220 |
| 42. N,N—Diethyl ethanol amine | 220 |
| 43. (N,N,N',N'-tetrakis (2-hydroxypropyl) ethylene diamine | 210 |
| 44. Borax pentahydrate | 210 |
| 45. TETRONIC 908 (EO/PO block polymer from ethylene diamine, MW-2500) | 210 |
| 46. TETRONIC 304 (EO/PO block polymer from ethylene diamine, MW-1650) | 210 |
| 47. Pentaerythritol | 210 |
| 48. A polyimine of approx. 50,000 MW | 210 |
| 49. Aluminum citrate | 210 |
| 50. TETRONIC 50R8 (PO/EO Block polymer from ethylene diamine, MW-10,2000) | 200 |
| 51. Borax pentahydrate | 200 |
| 52. N,N,N,N—tetrakis (hydroxyethyl) ethylene diamine | 200 |
| 53. Triethanolamine | 200 |
| 54. 50 ppm $H_3BO_3$ + 75 ppm glycerine | 200 |
| 55. 2-nitro-2-ethyl-1,3 propanediol | 190 |
| 56. (50,000 MW 1:3 acrylamide/acrylic acid polymer) | 190 |
| 57. 10,000 MW 3:1 acrylamide/acrylic acid polymer | 190 |
| 58. Polybor (sodium octaborate $4H_2O$) | 190 |
| 59. (CORCAT P-18 (Linear 1,800 MW polyimine) | 190 |

TABLE VII-continued

Silica Inhibition Screening Data

| Chemical Treatment (100 ppm Actives) | Total Silica Filtered (ppm $SiO_2$) |
|---|---|
| 60. Triethanolamine ester boric acid (as 100 ppm $H_3BO_3$) | 190 |
| 61. Tris (hydroxymethyl) nitromethane | 180 |
| 62. Methyl quaternized polyimine of approx. 25,000 MW | 180 |
| 63. Monoethanolamine ester boric acid (as 100 ppm $H_3BO_3$) | 180 |
| 64. 50 ppm $H_3BO_3$ + 146 ppm mannitol | 180 |
| 65. Sodium metaborate . $4H_2O$ | 170 |

TABLE VIII

Efficacy of Polyamines for Silica Control

| Name | Formula Weight | Notes on Amine | Structure | Total Filtered ppm - $SIO_2$ |
|---|---|---|---|---|
| ethylenediamine | 60 | primary | $NH_2CH_2CH_2NH_2$ | 290 |
| triethylenetetramine | 146 | primary and secondary* | $NH_2(CH_2CH_2NH)_2CH_2CH_2NH_2$* | 280 |
| 1,6-hexamethylenediamine | 116 | primary | $NH_2(CH_2)_6NH_2$ | 270 |
| Bis-hexamethylenetriamine | 215 | primary and secondary | $NH_2(CH_2)_6NH(CH_2)_6NH_2$ | 270 |
| tetraethylenepentamine | 189 | primary** and secondary | $NH_2(CH_2CH_2NH)_3CH_2CH_2NH_2$** | 240 |

*Theoretical structure is linear, but with increasing molecular weight, the process forms increasing amounts of tertiary isomers. Extreme theoretical isomer is TREN, molweight of 146. TREN [tris(2-aminoethyl)amine] is $N(CH_2CH_2NH_2)_3$. Not tested but expected to be poor performer.

**Theoretical structure is linear but process will tend to create increasing levels of tertiary isomers with increased molecular weight. For example, Nalco's N-107 has modest activity of 260 ppm $SiO_2$. It is a 2000 molecular weight polyimine polymer containing about 25% primary amine, 25% secondary amine and 50% tertiary amines or piperazine structure. Higher molecular weight polymers are less active.

TABLE IX

EFFECT OF BORIC ACID ON $SiO_2$ INHIBITION SCREENING TESTS

| ppm Treatment | Temperature °C. | ppm $Ca^{2+}$ as $CaCO_3$ | pH Initial | pH Final | ppm $SiO_2$ Soluble (Reactive) | ppm $SiO_2$ Total by AA |
|---|---|---|---|---|---|---|
| None | 100 | 300 | 8.4 | 9.21 | U - 170 / F - 200 | U - 330 / F - 230 |
| 100 | 100 | 300 | 8.2+ | 8.85 | U - 140 / F - 130 | U - 400 / F - 390 |
| 100 | 100 | 300 | 8.4 | — | U - 150 / F - 140 | U - 310 / F - 330 |

U - Unfiltered
F - Filtered through 0.45 milipore

TABLE X

Efficacy of Alkanolamines for Silica Control

| Name | Formula Weight | Notes on Amine | Structure | Total Filtered ppm - $SIO_2$ |
|---|---|---|---|---|
| monoethanolamine | 61 | primary | $HOCH_2CH_2NH_2$ | 290 |
| diethanolamine | 105 | secondary | $HOCH_2CH_2NHCH_2CH_2$ | 290 |
| N—ethylaminomonoethanolamine | 104 | primary and secondary | $HOCH_2CH_2NHCH_2CH_2NH_2$ | 290 |
| N,N—diethylethanolamine | 117 | tertiary | $HOCH_2CH_2N(C_2H_5)_2$ | 220 |
| triethanolamine | 149 | tertiary | $HOCH_2CH_2N(C_2H_5OH)_2$ | 200 |
| tetramethylammoniumchloride | 109.5 | quaternary | $N^+ (CH_3)_4 Cl^-$ | 230 |
| N,N,N,'N'—tetrakis-(hydroxyethyl)ethylenediamine | 236.3 | tertiary | $(HOCH_2CH_2)_2NCH_2CH_2N(CH_2CH_2OH)_2$ | 200 |

Efficacy of Boron Compounds for Silica Control (Theoretical Input Silica - 500 ppm $SiO_2$)

| Chemical Name** | Structure | Molecular weight | Total Silica* (ppm $SiO_2$) |
|---|---|---|---|
| Boric acid | $B(OH)_3$ | 61.8 | 330-390 |
| Borontrifluoride ethyl-amine complex | $BF_3 \cdot C_2H_5NH_2$ | 112.8 | 360 |
| Fluoboric acid | $HBF_4$ | 104.8 | 380 |
| Sodium metaborate-tetrahydrate | $Na_2B_2O_4 \cdot 4H_2O$ | 203.7 | 170 with extremely slow filtering |
| Sodium tetraborate-pentahydrate | $Na_2B_4O_7 \cdot 5H_2O$ | 291.3 | 210 |
| Aluminum Citrate | $Al(C_6H_8O_7)$ | — | 210 |
| Polybor (sodium octaborate tetrahydrate) | $Na_2B_8O_{13} \cdot 4H_2O$ | 412.5 | 190 |
| Blank final pH-9.0-9.1 | — | — | 170 |
| Blank final pH-9.2 | — | — | 200-230 |
| Theoretical at pH 6-8 | — | — | 120 |
| Theoretical at pH 9 | — | — | 138 |
| Theoretical at pH 9.5 | — | — | 180 |

*Total silica is analyzed by AA after filtering through 0.45 micron milipore filter.
**All Boron compounds tested at equivalent to 100 ppm Boric acid.

TABLE XII

Efficacy of Polyhydroxy Compounds for Silica Control

| Name | Formula Weight | Structure | Total Filtered ppm - $SiO_2$ |
|---|---|---|---|
| Ethylenegylcol | 62 | $CH_2OHCH_2OH$ | 280 |
| glycerine | 92 | $CH_2OHCHOHCH_2OH$ | 260 |
| mannitol and sorbitol | 182 | stereoisomers $CH_2OH(CHOH)_4CH_2OH$ | 230 |
| pentaerythritol | 136 | $(CH_2OH)_3C-CH_2OH$ | 210 |
| tris(hydroxymethyl)-nitromethane | 151 | $(CH_2OH)_3C \leq NO_2$ | 180 |
| tris(hydroxymethyl)-aminomethane | 121 | $(CH_2OH)_2C-NH_2$ | 240 |
| tetramethyl-ammonium-chloride | 109.5 | $N^+ (CH_3)_4 Cl^-$ | 230 |

RESULTS

The data indicated in the Tables is conclusive in defining the effectiveness of the polypolar organic chemical treatment compounds when used singly, in combination amongst themselves, and in combination with the boron compounds which form orthoborate ion when dissolved in or hydrolyzed by these industrial waters.

In fact, boric acid and its water-soluble salts and/or any boron compound which forms orthoborate ion by dissolving in industrial waters or by hydrolysis under these industrial water environments may by themselves protect against and inhibit the formation of amorphous silica scale on surfaces in contact with these industrial waters. This is the subject of another patent application. Table VII show the activity of various compounds and admixtures in inhibiting amorphous silica scale formation in contact with industrial waters having an alkalinity above 7.0. These results are derived using the screening test outlined above. Table VIII and IX compare the activity of boric acid and a variety of boron-containing compounds tested alone and compares this activity against a test with aluminum citrate compound which is thought by many authors to be useful as a dispersant or amorphous silica scale inhibitor, for silica in aqueous media. The comparative data clearly indicates that only the polypolar organic compounds of this invention by themselves or in combination with orthoboric ionic compounds, or the orthoboric ionic compounds or boron compounds which give orthoboric ions on hydrolysis are truly active in inhibiting amorphous silica scale formation in these industrial water environments. As can be seen in the data presented in Tables VII, VIII, and IX, polymeric species having a molecular weight above 500 simply do not show evidence of significant activity in the method of inhibiting amorphous silica scale formation.

To further demonstrate efficacy of certain combinations of chemicals, tests in a pilot cooling tower study using a high silica water having the following composition were conducted:

$Ca^{2+}$ as $CaCO_3$—60 ppm
$Mg^{2+}$ as $CaCO_3$—26 ppm
Silica as $SiO_2$—61 ppm
$HCO_3$ as $CaCO_3$—130 ppm The pilot cooling tower was operated with 8 tubes of mixed metallurgy and under a heat load created by 8 separate 500 watt heaters. The results of these pilot cooling tower tests were obtained using a chemical treatment which contained a 4:1 weight ratio blend of boric acid and monoethanol amine at a test level of about 50 ppm. Actually, the feedwater going into the pilot cooling tower was treated with 40 ppm boric acid and 10 ppm of monoethanol amine simultaneously. The pilot cooling tower pH was controlled by the addition of acid under automatic control to a pH level of between 6.8 and 7.2.

The results indicated that correct mass balance was achieved up to and including between 5.5 and 6.0 cycles for calcium, magnesium and silica. At a concentration of 7 cycles, the mass balance no longer occurred, indicating scale formation, but the silica concentration in the cycled waters was at 350 ppm indicating that the scale which was forming was a hardness scale not an amorphous silica scale. Therefore, even though incorrect mass balances were being achieved, inhibition of amorphous silica scale was still accomplished. Analysis of the pilot cooling tower blowdown indicated 620 ppm calcium as calcium carbonate, 220 ppm magnesium as calcium carbonate, and 432 ppm silica as $SiO_2$.

The pilot cooling tower studies also provide the opportunity to formulate treating agents for commercial use. The best combination of the ingredients mentioned above seems to be a formulation containing about 50% soft water, 25% boric acid, and 25% monoethanolamine. This formulation combines the effectiveness of the monoethanolamine and the effectiveness of boric acid and, in addition, provides increased solubility for boric acid since the acid itself has only a 6% solubility in ambient temperature water. Formulated as the mixture above, the concentration of boric acid as can be seen is greatly increased.

Tables X, XI, and XII compare the efficacy of three related families of low molecular weight polypolar organic compounds. The data in these Tables refer respectively to polyamines, alkanolamines, and polyhydroxy compounds. This data shows that the low molecular weight polypolar organic compounds of this invention are most active in inhibiting amorphous silica scale formation in industrial waters. Compounds containing only tertiary amines do not seem to be active. Similarly, compounds containing only quaternary amines are not active in regards to inhibiting the formation of amorphous silica scale. It should also be noted that not any polypolar compound containing nitrogen functionality is useful. For example, compounds containing the nitro functional group are extremely ineffective compared to those compounds containing the amine groups as can be seen from the data presented in these Tables.

When the boron compounds are used in the treatment, the pH rise normally observed when the silica scale is forming, is not observed. However, when the industrial waters containing silica are treated with the polypolar organic compounds of this invention, the pH always rises dramatically and strong tyndall effects are observed even after filtration. It is entirely possible that the mechanism which inhibits amorphous silica scale formation in the presence of these polypolar organic compounds is a classical colloid stabilization mechanism, at least to a significant extent. However, the invention is not to be limited by the proposed mechanism. It is merely important that the presence of these organic polypolar compounds inhibit scale formation on surfaces in contact with industrial waters having been treated with these polypolar compounds.

Having described my invention, I claim:

1. A method of inhibiting amorphous silica scale formation on surfaces in contact with industrial waters having a ph of at least 5.0 which comprises treating said waters with an effective amount for the purpose of inhibiting amorphous silica scale formation of at least one water soluble polypolar organic compound containing hydroxyl and/or primary amino functional groups, wherein the polypolar organic compound has a molecular weight not exceeding about 500, and is selected from the group consisting of glycerine, 1,5-hexamethylenediamine, Bis-hexamethylene triamine, ethylene glycol, triethylenetetraamine, ethylene diamine, diethanolamine, monoethanolamine, N-ethylamine monoethanolamine.

2. The method of claim 1 wherein the polypolar organic compound has a molecular weight not exceeding about 200.

3. The method of claim 1 wherein the polypolar organic compound is a polyhydroxy compound having a molecular weight not exceeding about 200.

4. The method of claim 1 wherein the polypolar compound is a polyamino compound having a molecular weight not exceeding about 200, and containing only primary amino functional groups.

5. The method of claim 1 wherein the polypolar compound is an alkanolamine having a molecular weight not exceeding about 200.

6. The method of claim 1 wherein the water soluble polypolar organic compound is chosen from the group consisting of ethylene glycol, glycerine, monoethanolamine, and ethylene diamine.

7. The method of claim 1 wherein the effective amount of polypolar organic compound is at least 10 ppm.

8. A method of inhibiting amorphous silica scale formation on surfaces in contact with industrial waters having a ph of at least 5.0 which comprises treating said waters with an effective amount of an admixture of a water-soluble polypolar organic compound containing hydroxyl, primary amino, or secondary amino functional groups, and mixtures thereof, having a molecular weight not exceeding about 500, with a boron compound which forms orthoborate ion when dissolved in or hydrolyzed by said waters, and wherein the polypolar organic compound and orthoborate ion are in a weight ratio of about 10:1 to 1:10.

9. The method of claim 8 wherein the polypolar organic compound is chosen from the group consisting of ethylene glycol, glycerine, mannitol, sorbitol, tris(hydroxymethyl)methane, tris(hydroxymethyl)methanol, monoethanolamine, diethanolamine, N-ethylaminomonoethanolamine, N,N, diethanolamine, N,N,N,N-tetrakis(hydroxylethyl)ethylenediamine, ethylene diamine, triethylenetetramine, 1,6 hexamethylenediamine, Bis-hexamethylenetriamine, tetraethylenepentamine, and mixtures thereof, and the boron compound is chosen from the group consisting of boric acid and its water-soluble salts, boron trihalides, fluoboric acid and its water-soluble salts, boron trifluoride-ethyl amine complex, and mixtures thereof.

10. The method of claim 1 or 8 wherein the industrial waters are alkaline cooling waters.

* * * * *